(12) United States Patent
Wang et al.

(10) Patent No.: US 7,136,054 B2
(45) Date of Patent: Nov. 14, 2006

(54) CAMERA-PEN-TIP MAPPING AND CALIBRATION

(75) Inventors: Jian Wang, Beijing (CN); Liyong Chen, Beijing (CN); Yingnong Dang, Beijing (CN); Xiaoxu Ma, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 544 days.

(21) Appl. No.: 10/753,023

(22) Filed: Jan. 6, 2004

(65) Prior Publication Data

US 2005/0146518 A1    Jul. 7, 2005

(51) Int. Cl.
*G09G 5/00* (2006.01)

(52) U.S. Cl. .................................. 345/179; 178/19.05

(58) Field of Classification Search ............... 345/179, 345/181, 183; 178/19.01, 19.05, 18.09; 715/858, 715/859; 348/222.1, 208.3; 382/313; 361/686; 73/1.79; 33/503
See application file for complete search history.

(56) References Cited

U.S. PATENT DOCUMENTS

| | | | |
|---|---|---|---|
| 5,146,552 A | 9/1992 | Cassorla et al. | |
| 5,414,227 A | 5/1995 | Schubert et al. | |
| 5,581,637 A | 12/1996 | Cass et al. | |
| 5,581,682 A | 12/1996 | Anderson et al. | |
| 5,626,620 A | 5/1997 | Kieval et al. | |
| 5,855,594 A | 1/1999 | Olive et al. | |
| 6,044,301 A | 3/2000 | Hartlaub et al. | |
| 6,208,894 B1 | 3/2001 | Schulman et al. | |
| 6,492,981 B1 | 12/2002 | Stork et al. | |
| 6,551,357 B1 | 4/2003 | Madduri | |
| 2001/0037132 A1 | 11/2001 | Whitehurst et al. | |
| 2003/0081000 A1 | 5/2003 | Watanabe et al. | |
| 2003/0117378 A1 | 6/2003 | Carro | |

FOREIGN PATENT DOCUMENTS

| | | | |
|---|---|---|---|
| JP | 2002-108551 | * | 4/2002 |
| WO | WO 99/60469 | | 11/1999 |

OTHER PUBLICATIONS

C. Decurtins, M.C. Norrie, and B. Signer, "Digital Annotation of Printed Documents", CIKM '03 Nov. 3-8, 2003, New Orleans, Louisiana, pp. 552-555☐.

I. Dumer, D. Micciancio and M. Sudan, "Hardness of Approximating the Minimum Distance of a Linear Code", 1999 IEEE, pp. 475-484☐.

(Continued)

*Primary Examiner*—Richard Hjerpe
*Assistant Examiner*—Abbas Abdulselam
(74) *Attorney, Agent, or Firm*—Banner & Witcoff, Ltd.

(57) ABSTRACT

X-y positions of a digital pen's tip may be determined by using a calibration parameter to map the x-y positions of the respective centers of images captured by the pen's camera. The calibration parameter may be generated by iteratively calculating estimates of the calibration parameter. Calibration input data may be produced by a user placing the pen tip in a fixed location on a surface, which may be a positionally encoded medium, such as paper, and then rotating the pen and/or moving the opposite end of the pen in various directions to capture multiple images for use in generating the calibration parameter. A user may perform such a calibration procedure without the need for complicated calibration equipment typically used in connection with conventional calibration techniques.

25 Claims, 12 Drawing Sheets

OTHER PUBLICATIONS

D. Clark and L. Weng, "Maximal and Near-Maximal Shift Register Sequences: Efficient Event Counters and Easy Discrete Logarithms" (pp. 1-23), IEEE Transaction on Computers 43, 5 (May 1994), pp. 560-568.

G. Golovchinsky and L. Denoue, "Moving Markup: Repositioning Freeform Annotations", UIST '02, Oct. 27-30, 2002, Paris, France, vol. 4, Issue 2, pp. 21-24.

A.J. Brush, D. Bargeron, A. Gupta and JJ Cadiz, "Robust Annotation Positioning in Digital Documents", SIGCHI '01, Mar. 31-Apr. 4, 2001, Seattle, Washington, pp. 285-292.

Okad, et al, "A Method for Docmuent Digitizer by Real Time Assembling of Mosaic Pictures", Scripta Publishing Co., Systems, Computers, Controls. vol. 13, No. 5, Sep. 1982, pp. 74-80.

\* cited by examiner

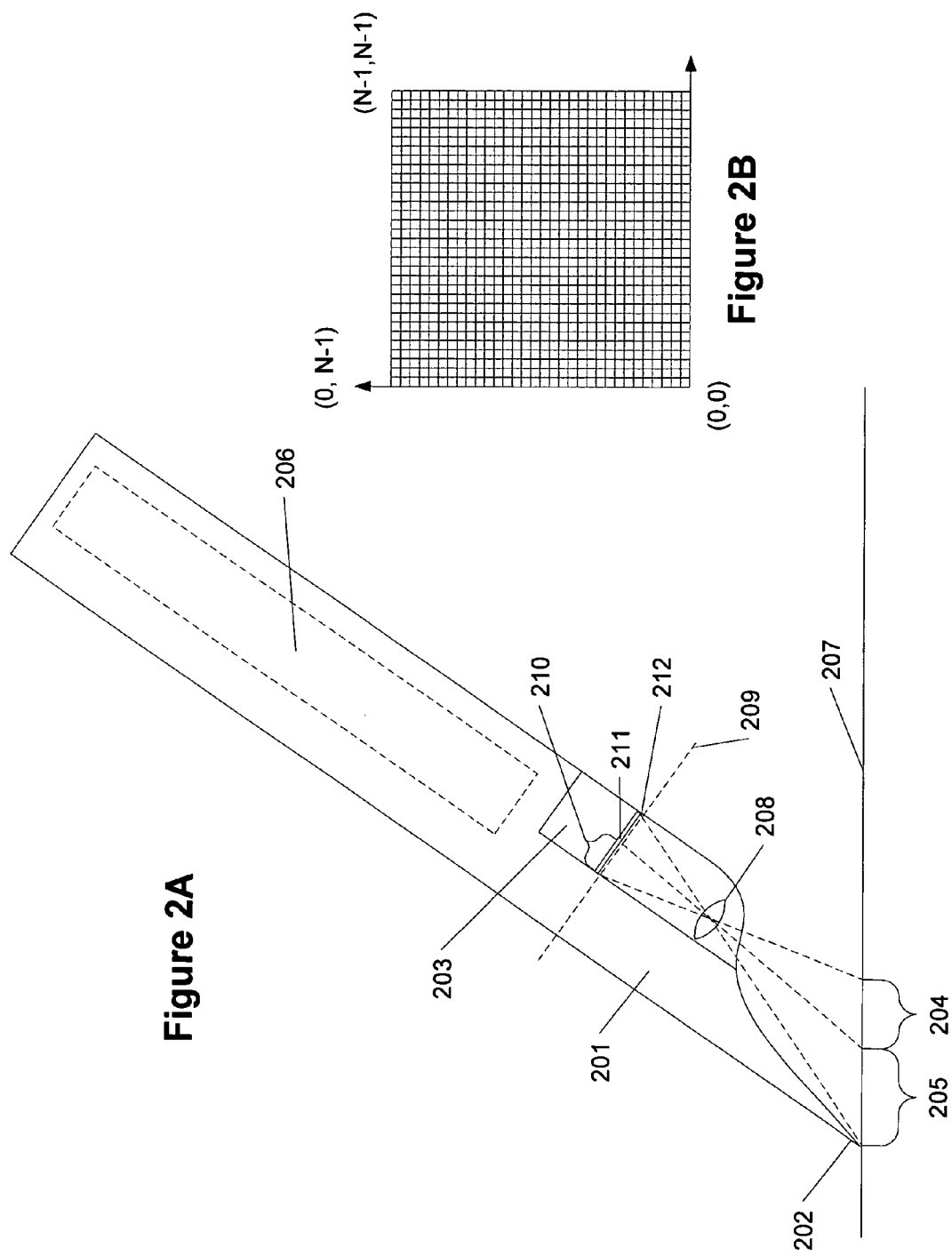

Figure 3A  0000010 00 01100 0101 001 111010 0 0111001 0 010110 111 0110 01101 01 0111111
Figure 3B  0000000 0011101 0100111 1110100 0111010 1000101 1110100 0100111 0011101
Figure 3C  0001001000 0011111110 0101111101 0100111001 0111001001 011100111 0010111010 011000011
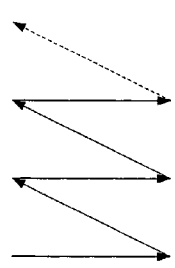
Figure 3D
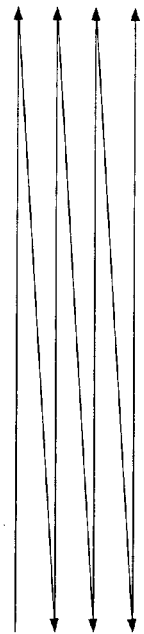
Figure 3E
Figure 3F

Figure 4A
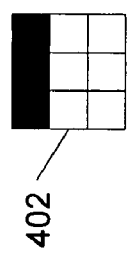 0
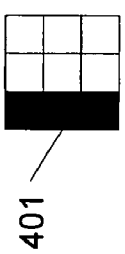 1
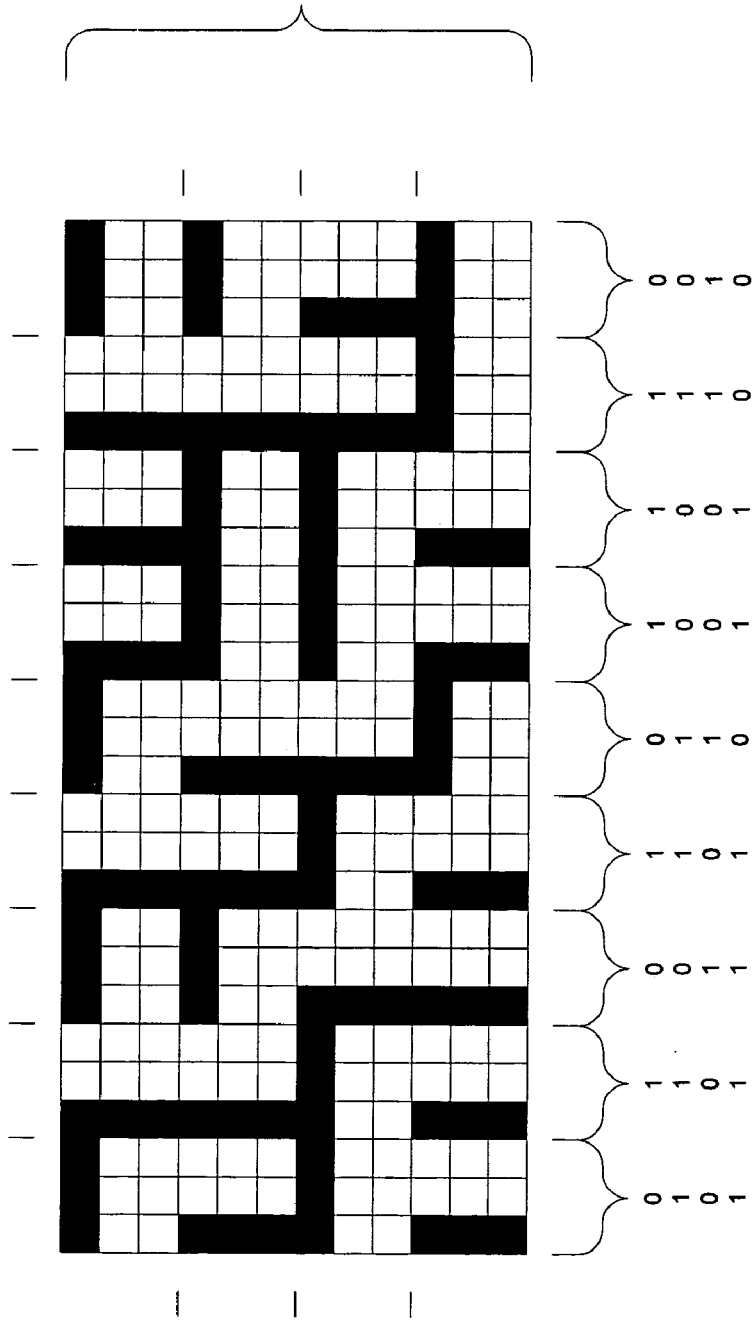
Figure 4B

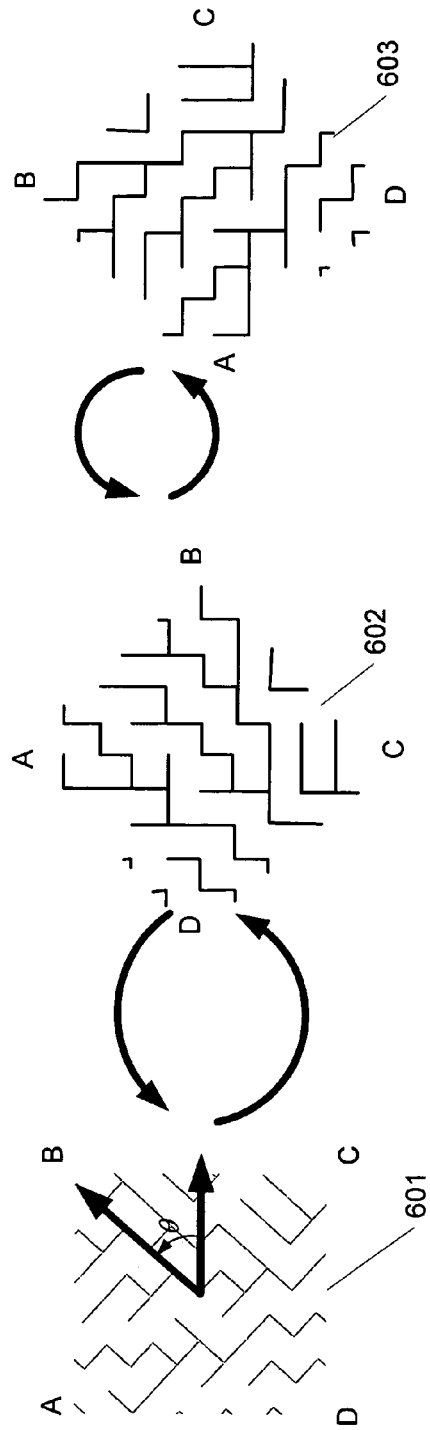

CAMERA-PEN-TIP MAPPING AND CALIBRATION

TECHNICAL FIELD

Embodiments of the invention relate to interaction between a positionally encoded medium and a digital pen. More particularly, embodiments of the invention relate to calibrating a digital pen and mapping locations decoded from camera-captured images to corresponding locations of the tip of the pen.

BACKGROUND OF THE INVENTION

Computer users are accustomed to using a mouse and keyboard as a way of interacting with a personal computer. While personal computers provide a number of advantages over written documents, most users continue to perform certain functions using printed paper. Some of these functions include reading and annotating written documents. In the case of annotations, the printed document assumes a greater significance because of the annotations placed on it by the user. One of the difficulties, however, with having a printed document with annotations is the later need to have the annotations entered back into the electronic form of the document. This requires the original user or another user to wade through the annotations and enter them into a personal computer. In some cases, a user will scan in the annotations and the original text, thereby creating a new document. These multiple steps make the interaction between the printed document and the electronic version of the document difficult to handle on a repeated basis. Further, scanned-in images are frequently non-modifiable. There may be no way to separate the annotations from the original text. This makes using the annotations difficult. Accordingly, an improved way of handling annotations is needed.

One technique of capturing handwritten information is by using a pen whose location may be determined during writing. One pen that provides this capability is the Anoto pen by Anoto Inc. This pen functions by using a camera to capture an image of paper encoded with a predefined pattern. An example of the image pattern is shown in FIG. 15. This pattern is used by the Anoto pen (by Anoto Inc.) to determine a location of a pen on a piece of paper. However, it is unclear how efficient the determination of the location is with the system used by the Anoto pen. To provide efficient determination of the location of the captured image, a system is needed that provides efficient decoding of the captured image.

When annotating a document, a user may mark the document by moving a pen tip with respect to the document. The path of the pen tip may comprise a plurality of strokes, where each stroke corresponds to a series of captured images. Hence, efficiently identifying the path of the pen in order to process the annotation on a document would be desirable.

Further, The x-y coordinates calculated from the center of the captured images may not represent the actual location of the tip of the pen. To map the center of the captured image to the pen tip, techniques for calibrating the relationship between the pen tip and the center of images captured by the camera would be desirable. Conventional calibration techniques, however, typically require complicated equipment and/or involved calibration procedures.

Each time a user changes a pen's ink cartridge, which may happen relatively frequently, calibration may be performed. Therefore, techniques for performing calibration should be simple, relatively quick, and accurate. And such techniques should not require complicated equipment of the type typically used in connection with conventional calibration techniques.

SUMMARY OF THE INVENTION

X-y positions of the pen tip may be determined by using a calibration parameter to map the x-y positions of the respective centers of images captured by the pen's camera to the x-y positions of the tip of the pen. The calibration parameter may be generated by iteratively calculating estimates of the calibration parameter.

A calibration module receives calibration input data, which may be produced by a user placing the pen tip at a fixed location on a surface, which may be a positionally encoded medium, such as paper, and then rotating the pen and/or moving the opposite end of the pen in various directions to capture multiple images for use in generating the calibration parameter. A user may perform such a calibration procedure without the need for complicated calibration equipment typically used in connection with conventional calibration techniques.

A mapping module may use the calibration parameter and recovered camera-captured-location information to generate recovered pen-tip-location information.

A virtual pen tip is used for mapping a recovered image-center location to a recovered pen-tip location. The location of the virtual pen-tip depends on a predetermined relationship between the actual pen-tip and the camera based on the configuration of the pen. The virtual pen-tip is the projected point of the pen-tip on an image sensor plane of the digital pen's camera.

Additional features and advantages of the invention will be apparent upon reviewing the following detailed description.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIGS. 2A and 2B show an image capture system and corresponding captured image in accordance with embodiments of the present invention.

FIGS. 3A through 3F show various sequences and folding techniques in accordance with embodiments of the present invention.

FIGS. 4A through 4E show various encoding systems in accordance with embodiments of the present invention.

FIG. 6 shows rotation of a captured image portion in accordance with embodiments of the present invention.

FIG. 7 shows various angles of rotation used in conjunction with the coding system of FIGS. 4A through 4E.

DETAILED DESCRIPTION OF THE INVENTION

Aspects of the present invention relate to determining the location of a captured image in relation to a larger image. The location determination method and system described herein may be used in combination with a multi-function pen.

The following is separated by subheadings for the benefit of the reader. The subheadings include: terms, general-purpose computer, image capturing pen, encoding of array, decoding, error correction, and location determination.

I. Terms

Pen—any writing implement that may or may not include the ability to store ink. In some examples, a stylus with no ink capability may be used as a pen in accordance with embodiments of the present invention.

Camera—an image capture system that may capture an image from paper or any other medium.

II. General Purpose Computer

Figure 1:
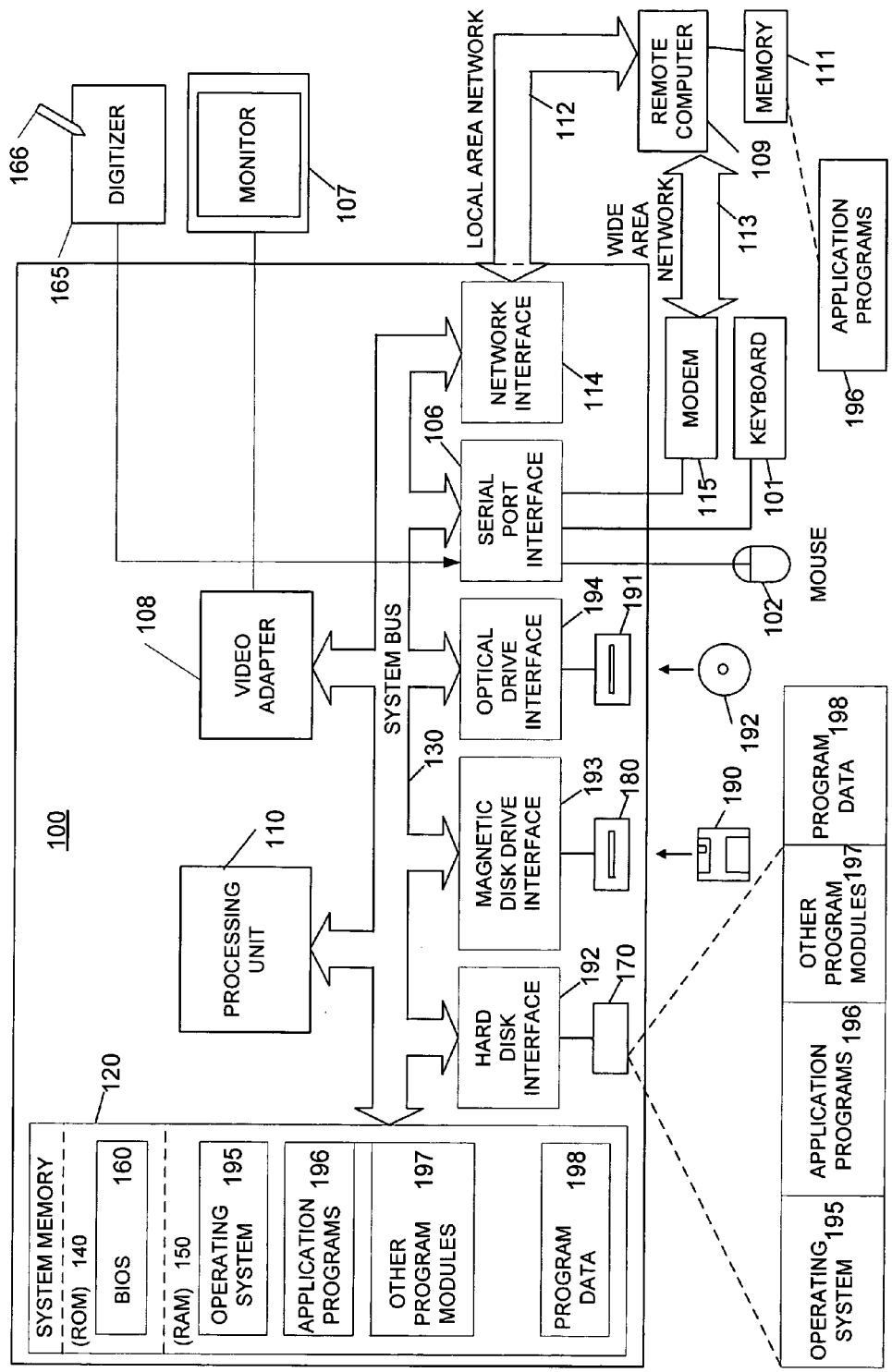
FIG. 1 shows a general description of a computer that may be used in conjunction with embodiments of the present invention.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

III. Image Capturing Pen

Aspects of the present invention include placing an encoded data stream in a displayed form that represents the encoded data stream. (For example, as will be discussed with FIG. 4B, the encoded data stream is used to create a graphical pattern.) The displayed form may be printed paper (or other physical medium) or may be a display projecting the encoded data stream in conjunction with another image or set of images. For example, the encoded data stream may be represented as a physical graphical image on the paper or a graphical image overlying the displayed image (e.g., representing the text of a document) or may be a physical (non-modifiable) graphical image on a display screen (so any image portion captured by a pen is locatable on the display screen).

This determination of the location of a captured image may be used to determine the location of a user's interaction with the paper, medium, or display screen. In some aspects of the present invention, the pen may be an ink pen writing on paper. In other aspects, the pen may be a stylus with the user writing on the surface of a computer display. Any interaction may be provided back to the system with knowledge of the encoded image on the document or supporting the document displayed on the computer screen. By repeatedly capturing images with a camera in the pen or stylus as the pen or stylus traverses a document, the system can track movement of the stylus being controlled by the user. The displayed or printed image may be a watermark associated with the blank or content-rich paper or may be a watermark associated with a displayed image or a fixed coding overlying a screen or built into a screen.

FIGS. 2A and 2B show an illustrative example of pen 201 with a camera 203. Pen 201 includes a tip 202 that may or may not include an ink reservoir. Camera 203 captures an image 204 from surface 207. Pen 201 may further include additional sensors and/or processors as represented in broken box 206. These sensors and/or processors 206 may also include the ability to transmit information to another pen 201 and/or a personal computer (for example, via Bluetooth or other wireless protocols).

FIG. 2B represents an image as viewed by camera 203. In one illustrative example, the field of view of camera 203 (i.e., the resolution of the image sensor of the camera) is 32×32 pixels (where N=32). In the embodiment, a captured image (32 pixels by 32 pixels) corresponds to an area of approximately 5 mm by 5 mm of the surface plane captured by camera 203. Accordingly, FIG. 2B shows a field of view of 32 pixels long by 32 pixels wide. The size of N is adjustable, such that a larger N corresponds to a higher image resolution. Also, while the field of view of the camera 203 is shown as a square for illustrative purposes here, the field of view may include other shapes as is known in the art.

The images captured by camera 203 may be defined as a sequence of image frames $\{I_i\}$, where $I_i$ is captured by the pen 201 at sampling time $t_i$. The sampling rate may be large or small, depending on system configuration and performance requirement. The size of the captured image frame may be large or small, depending on system configuration and performance requirement.

The image captured by camera 203 may be used directly by the processing system or may undergo pre-filtering. This pre-filtering may occur in pen 201 or may occur outside of pen 201 (for example, in a personal computer).

The image size of FIG. 2B is 32×32 pixels. If each encoding unit size is 3×3 pixels, then the number of captured encoded units would be approximately 100 units. If the encoding unit size is 5×5 pixels, then the number of captured encoded units is approximately 36.

FIG. 2A also shows the image plane 209 on which an image 210 of the pattern from location 204 is formed. Light received from the pattern on the object plane 207 is focused by lens 208. Lens 208 may be a single lens or a multi-part lens system, but is represented here as a single lens for simplicity. Image capturing sensor 211 captures the image 210.

The image sensor 211 may be large enough to capture the image 210. Alternatively, the image sensor 211 may be large enough to capture an image of the pen tip 202 at location 212. For reference, the image at location 212 is referred to as the virtual pen tip. It is noted that the virtual pen tip location with respect to image sensor 211 is fixed because of the constant relationship between the pen tip, the lens 208, and the image sensor 211.

The following transformation $F_{S \rightarrow P}$ transforms position coordinates in the image captured by camera to position coordinates in the real image on the paper:

$$L_{paper} = F_{S \rightarrow P}(L_{Sensor})$$

During writing, the pen tip and the paper are on the same plane. Accordingly, the transformation from the virtual pen tip to the real pen tip is also $F_{S \rightarrow P}$:

$$L_{pentip} = F_{S \rightarrow P}(L_{virtual-pentip})$$

The transformation $F_{S \rightarrow P}$ may be estimated as an affine transform. This simplifies as:

$$F'_{S \rightarrow P} = \begin{Bmatrix} \frac{s_x \sin\theta_y}{\cos\theta_x \sin\theta_y - \cos\theta_y \sin\theta_x}, & -\frac{s_x \cos\theta_y}{\cos\theta_x \sin\theta_y - \cos\theta_y \sin\theta_x}, & 0 \\ -\frac{s_y \sin\theta_x}{\cos\theta_x \sin\theta_y - \cos\theta_y \sin\theta_x}, & \frac{s_y \cos\theta_x}{\cos\theta_x \sin\theta_y - \cos\theta_y \sin\theta_x}, & 0 \\ 0, & 0, & 1 \end{Bmatrix}$$

as the estimation of $F_{S \rightarrow P}$, in which $\theta_x$, $\theta_y$, $s_x$, and $s_y$ are the rotation and scale of two orientations of the pattern captured at location 204. Further, one can refine $F'_{S \rightarrow P}$ by matching the captured image with the corresponding real image on paper. "Refine" means to get a more precise estimation of the transformation $F_{S \rightarrow P}$ by a type of optimization algorithm referred to as a recursive method. The recursive method treats the matrix $F'_{S \rightarrow P}$ as the initial value. The refined estimation describes the transformation between S and P more precisely.

Next, one can determine the location of virtual pen tip by calibration.

One places the pen tip 202 on a fixed location $L_{pentip}$ on paper. Next, one tilts the pen, allowing the camera 203 to capture a series of images with different pen poses. For each image captured, one may obtain the transformation $F_{S \rightarrow P}$. From this transformation, one can obtain the location of the virtual pen tip $L_{virtual-pentip}$:

$$L_{virtual-pentip} = F_{P \rightarrow S}(L_{pentip})$$

where $L_{pentip}$ is initialized as (0, 0) and $$F_{P \rightarrow S} = (F_{S \rightarrow P})^{-1}$$

By averaging the $L_{virtual-pentip}$ obtained from each image, a location of the virtual pen tip $L_{virtual-pentip}$ may be determined. With $L_{virtual-pentip}$, one can get a more accurate estimation of $L_{pentip}$. After several times of iteration, an accurate location of virtual pen tip $L_{virtual-pentip}$ may be determined.

The location of the virtual pen tip $L_{virtual-pentip}$ is now known. One can also obtain the transformation $F_{S \rightarrow P}$ from the images captured. Finally, one can use this information to determine the location of the real pen tip $L_{pentip}$:

$$L_{pentip} = F_{S \rightarrow P}(L_{virtual-pentip})$$

Mapping the center of camera-captured image to a corresponding pen-tip location in paper coordinates and calibration parameters that may be used in mapping of this type in accordance with various embodiments of the invention are discussed below in sections VIII and IX.

IV. Encoding of Array

A two-dimensional array may be constructed by folding a one-dimensional sequence. Any portion of the two-dimensional array containing a large enough number of bits may be used to determine its location in the complete two-dimensional array. However, it may be necessary to determine the location from a captured image or a few captured images. So as to minimize the possibility of a captured image portion being associated with two or more locations in the two-dimensional array, a non-repeating sequence may be used to create the array. One property of a created sequence is that the sequence does not repeat over a length (or window) n. The following describes the creation of the one-dimensional sequence then the folding of the sequence into an array.

IV.A. Sequence Construction

A sequence of numbers may be used as the starting point of the encoding system. For example, a sequence (also referred to as an m-sequence) may be represented as a q-element set in field $F_q$. Here, $q=p^n$ where $n \geq 1$ and p is a prime number. The sequence or m-sequence may be generated by a variety of different techniques including, but not limited to, polynomial division. Using polynomial division, the sequence may be defined as follows:

$$\frac{R_l(x)}{P_n(x)}$$

where $P_n(x)$ is a primitive polynomial of degree n in field $F_q[x]$ (having $q^n$ elements). $R_l(x)$ is a nonzero polynomial of degree l (where l<n) in field $F_q[x]$. The sequence may be created using an iterative procedure with two steps: first, dividing the two polynomials (resulting in an element of field $F_q$) and, second, multiplying the remainder by x. The computation stops when the output begins to repeat. This process may be implemented using a linear feedback shift register as set forth in an article by Douglas W. Clark and Lih-Jyh Weng, "Maximal and Near-Maximal Shift Register Sequences: Efficient Event Counters and Easy Discrete Logarithms," IEEE Transactions on Computers 43.5 (May 1994, pp 560–568). In this environment, a relationship is established between cyclical shifting of the sequence and polynomial $R_l(x)$: changing $R_l(x)$ only cyclically shifts the sequence and every cyclical shifting corresponds to a polynomial $R_l(x)$. One of the properties of the resulting sequence is that, the sequence has a period of $q^n-1$ and within a period, over a width (or length) n, any portion exists once and only once in the sequence. This is called the "window property". Period $q^n-1$ is also referred to as the length of the sequence and n as the order of the sequence.

The process described above is but one of a variety of processes that may be used to create a sequence with the window property.

IV.B. Array Construction

The array (or m-array) that may be used to create the image (of which a portion may be captured by the camera) is an extension of the one-dimensional sequence or m-sequence. Let A be an array of period $(m_1, m_2)$, namely $A(k+m_1, l) = A(k, l+m_2) = A(k, l)$. When an $n_1 \times n_2$ window shifts through a period of A, all the nonzero $n_1 \times n_2$ matrices over $F_q$ appear once and only once. This property is also referred to as a "window property" in that each window is unique. A widow may then be expressed as an array of period $(m_1, m_2)$ (with $m_1$ and $m_2$ being the horizontal and vertical number of bits present in the array) and order $(n_1, n_2)$.

A binary array (or m-array) may be constructed by folding the sequence. One approach is to obtain a sequence then fold it to a size of $m_1 \times m_2$ where the length of the array is $L = m_1 \times m_2 = 2^n - 1$. Alternatively, one may start with a predetermined size of the space that one wants to cover (for example, one sheet of paper, 30 sheets of paper or the size of a computer monitor), determine the area $(m_1 \times m_2)$, then use the size to let $L \geq m_1 \times m_2$, where $L = 2^n - 1$.

A variety of different folding techniques may be used. For example, FIGS. 3A through 3C show three different sequences. Each of these may be folded into the array shown as FIG. 3D. The three different folding methods are shown as the overlay in FIG. 3D and as the raster paths in FIGS. 3E and 3F. We adopt the folding method shown in FIG. 3D.

To create the folding method as shown in FIG. 3D, one creates a sequence $\{a_i\}$ of length L and order n. Next, an array $\{b_{kl}\}$ of size $m_1 \times m_2$, where $\gcd(m_1, m_2) = 1$ and $L = m_1 \times m_2$, is created from the sequence $\{a_i\}$ by letting each bit of the array be calculated as shown by equation 1:

$$b_{kl} = a_i, \text{ where } k = i \bmod(m_1), l = i \bmod(m_2), i = 0, \ldots, L-1. \quad (1)$$

This folding approach may be alternatively expressed as laying the sequence on the diagonal of the array, then continuing from the opposite edge when an edge is reached.

Figure 11:
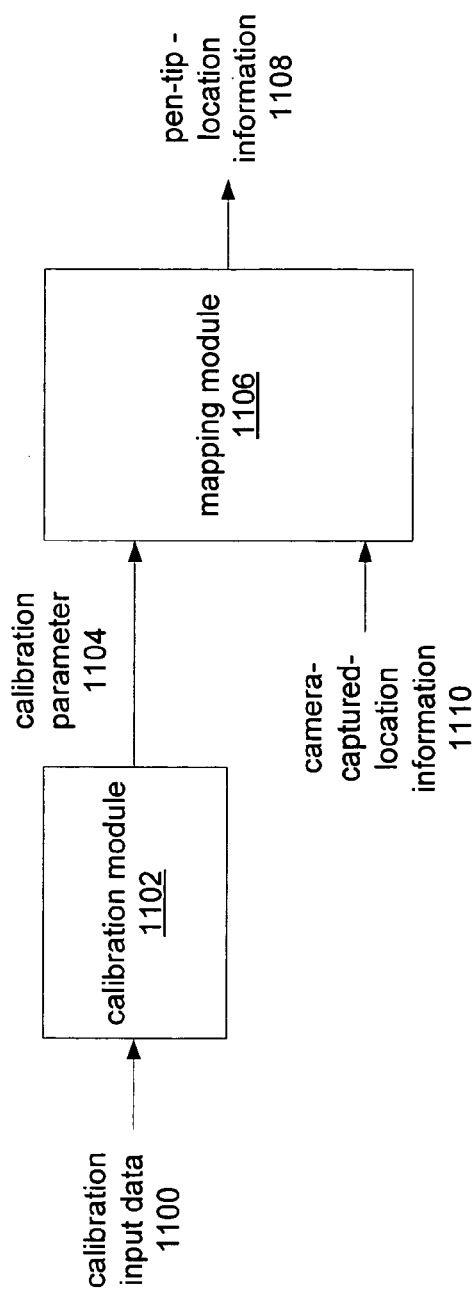
FIG. 11 depicts a calibration module and a mapping module in accordance with various embodiments of the invention.

FIG. 4A shows sample encoding techniques that may be used to encode the array of FIG. 3D. It is appreciated that other encoding techniques may be used. For example, an alternative coding technique is shown in FIG. 11.

Figure 4C:
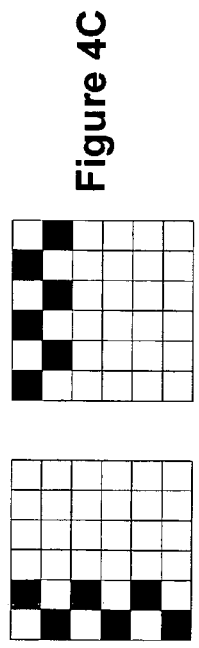
Figure 4D:
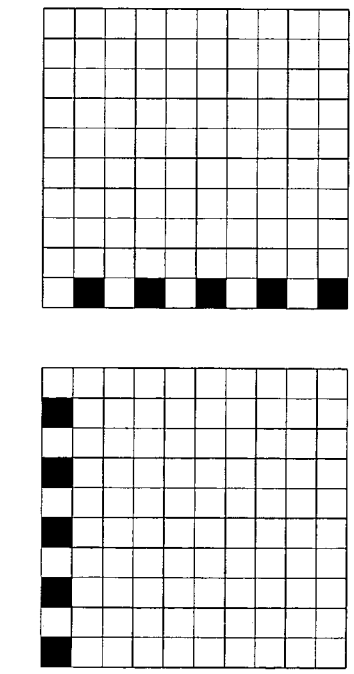
Figure 4E:
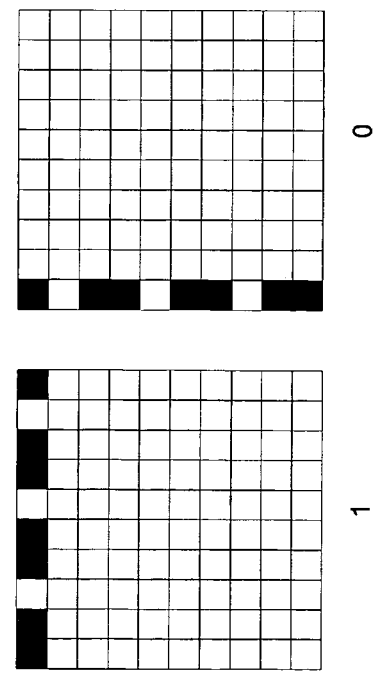

Referring to FIG. 4A, a first bit 401 (for example, "1") is represented by a column of dark ink. A second bit 402 (for example, "0") is represented by a row of dark ink. It is appreciated that any color ink may be used to represent the various bits. The only requirement in the color of the ink chosen is that it provides a significant contrast with the background of the medium to be differentiable by an image capture system. The bits in FIG. 4A are represented by a 3×3 matrix of cells. The size of the matrix may be modified to be any size as based on the size and resolution of an image capture system. Alternative representation of bits 0 and 1 are shown in FIGS. 4C–4E. It is appreciated that the representation of a one or a zero for the sample encodings of FIGS. 4A–4E may be switched without effect. FIG. 4C shows bit representations occupying two rows or columns in an interleaved arrangement. FIG. 4D shows an alternative arrangement of the pixels in rows and columns in a dashed form. Finally FIG. 4E shows pixel representations in columns and rows in an irregular spacing format (e.g., two dark dots followed by a blank dot).

Referring back to FIG. 4A, if a bit is represented by a 3×3 matrix and an imaging system detects a dark row and two white rows in the 3×3 region, then a zero is detected (or one). If an image is detected with a dark column and two white columns, then a one is detected (or a zero).

Here, more than one pixel or dot is used to represent a bit. Using a single pixel (or bit) to represent a bit is fragile. Dust, creases in paper, non-planar surfaces, and the like create difficulties in reading single bit representations of data units. However, it is appreciated that different approaches may be used to graphically represent the array on a surface. Some approaches are shown in FIGS. 4C through 4E. It is appreciated that other approaches may be used as well. One approach is set forth in FIG. 11 using only space-shifted dots.

A bit stream is used to create the graphical pattern 403 of FIG. 4B. Graphical pattern 403 includes 12 rows and 18 columns. The rows and columns are formed by a bit stream that is converted into a graphical representation using bit representations 401 and 402. FIG. 4B may be viewed as having the following bit representation:

$$\begin{bmatrix} 0 & 1 & 0 & 1 & 0 & 1 & 1 & 1 & 0 \\ 1 & 1 & 0 & 1 & 1 & 0 & 0 & 1 & 0 \\ 0 & 0 & 1 & 0 & 1 & 0 & 0 & 1 & 1 \\ 1 & 0 & 1 & 1 & 0 & 1 & 1 & 0 & 0 \end{bmatrix}$$

V. Decoding

When a person writes with the pen of FIG. 2A or moves the pen close to the encoded pattern, the camera captures an image. For example, pen 201 may utilize a pressure sensor as pen 201 is pressed against paper and pen 201 traverses a document on the paper. The image is then processed to determine the orientation of the captured image with respect to the complete representation of the encoded image and extract the bits that make up the captured image.

Figure 5A:
FIGS. 5A through 5D show four possible resultant corners associated with the encoding system according to FIGS. 4A and 4B.
Figure 5B:
Figure 5C:
Figure 5D:

For the determination of the orientation of the captured image relative to the whole encoded area, one may notice that not all the four conceivable corners shown in FIG. 5A–5D can present in the graphical pattern 403. In fact, with the correct orientation, the type of corner shown in FIG. 5A cannot exist in the graphical pattern 403. Therefore, the orientation in which the type of corner shown in FIG. 5A is missing is the right orientation.

Continuing to FIG. 6, the image captured by a camera 601 may be analyzed and its orientation determined so as to be interpretable as to the position actually represented by the image 601. First, image 601 is reviewed to determine the angle θ needed to rotate the image so that the pixels are horizontally and vertically aligned. It is noted that alternative grid alignments are possible including a rotation of the underlying grid to a non-horizontal and vertical arrangement (for example, 45 degrees). Using a non-horizontal and vertical arrangement may provide the probable benefit of eliminating visual distractions from the user, as users may tend to notice horizontal and vertical patterns before others. For purposes of simplicity, the orientation of the grid (horizontal and vertical and any other rotation of the underlying grid) is referred to collectively as the predefined grid orientation.

Next, image 601 is analyzed to determine which corner is missing. The rotation amount o needed to rotate image 601 to an image ready for decoding 603 is shown as o=(θ plus a rotation amount {defined by which corner missing}). The rotation amount is shown by the equation in FIG. 7. Referring back to FIG. 6, angle θ is first determined by the layout of the pixels to arrive at a horizontal and vertical (or other predefined grid orientation) arrangement of the pixels and the image is rotated as shown in 602. An analysis is then conducted to determine the missing corner and the image 602 rotated to the image 603 to set up the image for decoding. Here, the image is rotated 90 degrees counterclockwise so that image 603 has the correct orientation and can be used for decoding.

It is appreciated that the rotation angle θ may be applied before or after rotation of the image 601 to account for the missing corner. It is also appreciated that by considering noise in the captured image, all four types of corners may be present. We may count the number of corners of each type and choose the type that has the least number as the corner type that is missing.

Finally, the code in image 603 is read out and correlated with the original bit stream used to create image 403. The correlation may be performed in a number of ways. For example, it may be performed by a recursive approach in which a recovered bit stream is compared against all other bit stream fragments within the original bit stream. Second, a statistical analysis may be performed between the recovered bit stream and the original bit stream, for example, by using a Hamming distance between the two bit streams. It is appreciated that a variety of approaches may be used to determine the location of the recovered bit stream within the original bit stream.

Once one has the recovered bits, one needs to locate the captured image within the original array (for example, the one shown in FIG. 4B). The process of determining the location of a segment of bits within the entire array is complicated by a number of items. First, the actual bits to be captured may be obscured (for example, the camera may capture an image with handwriting that obscures the original code). Second, dust, creases, reflections, and the like may also create errors in the captured image. These errors make the localization process more difficult. In this regard, the image capture system may need to function with non-sequential bits extracted from the image. The following represents a method for operating with non-sequential bits from the image.

Let the sequence (or m-sequence) I correspond to the power series $I(x)=1/P_n(x)$, where n is the order of the m-sequence, and the captured image contains K bits of I $b=(b_0\ b_1\ b_2\ \ldots\ b_{K-1})^t$, where $K \geq n$ and the superscript t represents a transpose of the matrix or vector. The location s of the K bits is just the number of cyclic shifts of I so that $b_0$ is shifted to the beginning of the sequence. Then this shifted sequence R corresponds to the power series $x^s/P_n(x)$, or $R=T^s(I)$, where T is the cyclic shift operator. We find this s indirectly. The polynomials modulo $P_n(x)$ form a field. It is guaranteed that $x^s \equiv r_0+r_1x+\ldots r_{n-1}x^{n-1} \bmod(P_n(x))$. Therefore, we may find $(r_0, r_1, \ldots, r_{n-1})$ and then solve for s.

The relationship $x^s \equiv r_0 + r_1 x + \ldots r_{n-1} x^{n-1} \mod(P_n(x))$ implies that $R = r_0 + r_1 T(I) + \ldots + r_{n-1} T^{n-1}(I)$. Written in a binary linear equation, it becomes:

$$R = r^t A \quad (2)$$

where $r = (r_0 \ r_1 \ r_2 \ \ldots \ r_{n-1})^t$, and $A = (I \ T(I) \ \ldots \ T^{n-1}(I))^t$ which consists of the cyclic shifts of I from 0-shift to (n-1)-shift. Now only sparse K bits are available in R to solve r. Let the index differences between $b_i$ and $b_0$ in R be $k_i$, i=1,2, ...,k −1, then the $1^{st}$ and $(k_i+1)$-th elements of R, i=1,2, ...,k−1, are exactly $b_0, b_1, \ldots, b_{k-1}$. By selecting the $1^{st}$ and $(k_i+1)$-th columns of A, i=1,2, k−1, the following binary linear equation is formed:

$$b^t = r^t M \quad (3)$$

where M is an n×K sub-matrix of A.

If b is error-free, the solution of r may be expressed as:

$$\tilde{r}^t = \tilde{b}^t \tilde{M}^{-1} \quad (4)$$

where $\tilde{M}$ is any non-degenerate n×n sub-matrix of M and $\tilde{b}$ is the corresponding sub-vector of b.

With known r, we may use the Pohlig-Hellman-Silver algorithm as noted by Douglas W. Clark and Lih-Jyh Weng, "Maximal and Near-Maximal Shift Register Sequences: Efficient Event Counters and Easy Discrete Logarithms," IEEE Transactions on Computers 43.5 (May 1994, pp 560–568) to find s so that $x^s \equiv r_0 + r_1 x + \ldots r_{n-1} x^{n-1} \mod(P_n(x))$.

As matrix A (with the size of n by L, where $L = 2^n - 1$) may be huge, we should avoid storing the entire matrix A. In fact, as we have seen in the above process, given extracted bits with index difference $k_i$, only the first and $(k_i+1)$-th columns of A are relevant to the computation. Such choices of $k_i$ is quite limited, given the size of the captured image. Thus, only those columns that may be involved in computation need to saved. The total number of such columns is much smaller than L (where $L = 2^n - 1$ is the length of the m-sequence).

VI. Error Correction

If errors exist in b, then the solution of r becomes more complex. Traditional methods of decoding with error correction may not readily apply, because the matrix M associated with the captured bits may change from one captured image to another.

We adopt a stochastic approach. Assuming that the number of error bits in b, $n_e$, is relatively small compared to K, then the probability of choosing correct n bits from the K bits of b and the corresponding sub-matrix $\tilde{M}$ of M being non-degenerate is high.

When the n bits chosen are all correct, the Hamming distance between $b^t$ and $r^t M$, or the number of error bits associated with r, should be minimal, where r is computed via equation (4). Repeating the process for several times, it is likely that the correct r that results in the minimal error bits can be identified.

If there is only one r that is associated with the minimum number of error bits, then it is regarded as the correct solution. Otherwise, if there is more than one r that is associated with the minimum number of error bits, the probability that $n_e$ exceeds the error correcting ability of the code generated by M is high and the decoding process fails. The system then may move on to process the next captured image. In another implementation, information about previous locations of the pen can be taken into consideration. That is, for each captured image, a destination area where the pen may be expected next can be identified. For example, if the user has not lifted the pen between two image captures by the camera, the location of the pen as determined by the second image capture should not be too far away from the first location. Each r that is associated with the minimum number of error bits can then be checked to see if the location s computed from r satisfies the local constraint, i.e., whether the location is within the destination area specified.

If the location s satisfies the local constraint, the X, Y positions of the extracted bits in the array are returned. If not, the decoding process fails.

Figure 8:
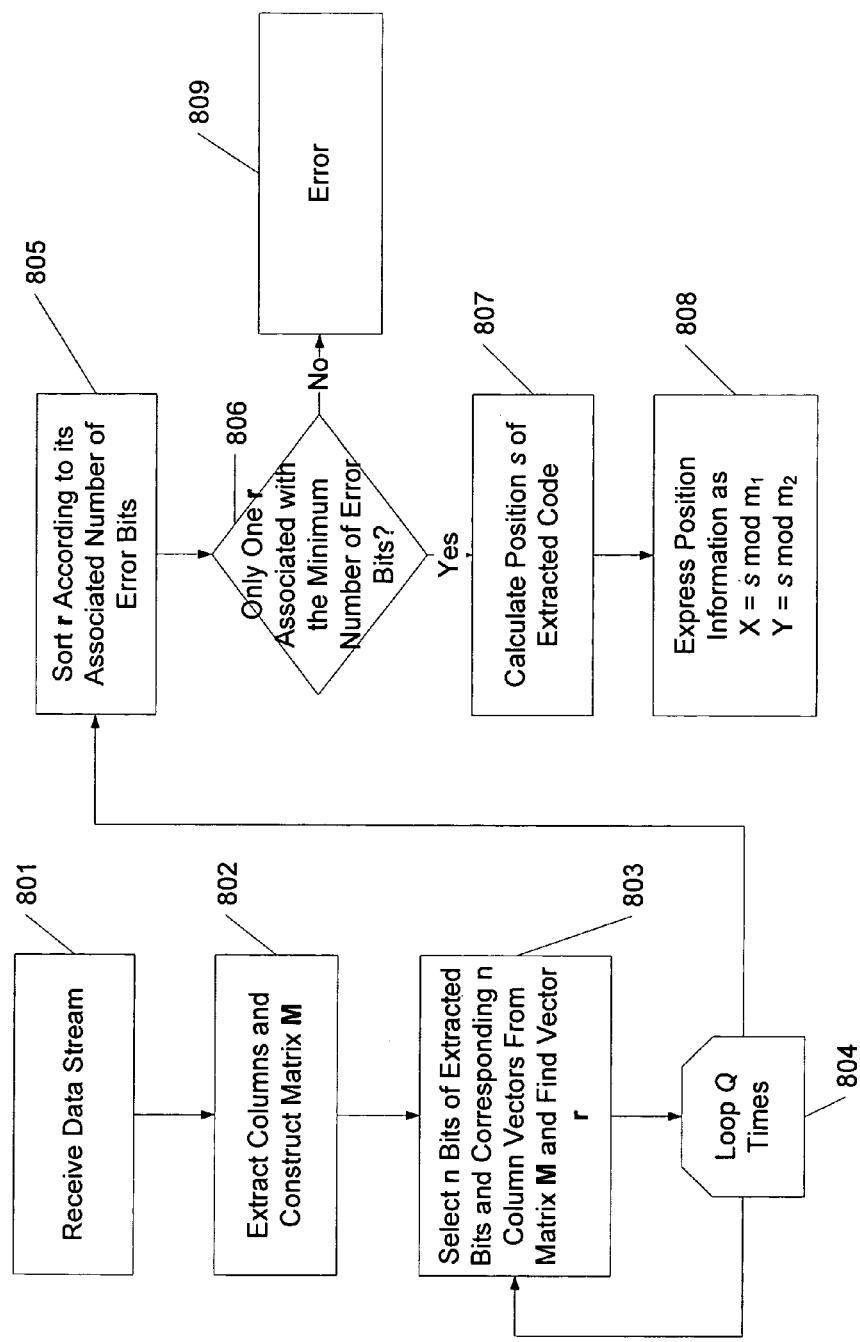
FIG. 8 shows a process for determining the location of a captured array in accordance with embodiments of the present invention.

FIG. 8 depicts a process that may be used to determine a location in a sequence (or m-sequence) of a captured image. First, in step 801, a data stream relating to a captured image is received. In step 802, corresponding columns are extracted from A and a matrix M is constructed.

In step 803, n independent column vectors are randomly selected from the matrix M and vector r is determined by solving equation (4). This process is performed Q times (for example, 100 times) in step 804. The determination of the number of loop times is discussed in the section Loop Times Calculation.

In step 805, r is sorted according to its associated number of error bits. The sorting can be done using a variety of sorting algorithms as known in the art. For example, a selection sorting algorithm may be used. The selection sorting algorithm is beneficial when the number Q is not large. However, if Q becomes large, other sorting algorithms (for example, a merge sort) that handle larger numbers of items more efficiently may be used.

The system then determines in step 806 whether error correction was performed successfully, by checking whether multiple r's are associated with the minimum number of error bits. If yes, an error is returned in step 809, indicating the decoding process failed. If not, the position s of the extracted bits in the sequence (or m-sequence) is calculated in step 807, for example, by using the Pohig-Hellman-Silver algorithm.

Next, the (X,Y) position in the array is calculated as: x=s mod $m_1$ and y=s mod $m_2$ and the results are returned in step 808.

VII. Location Determination

Figure 9:
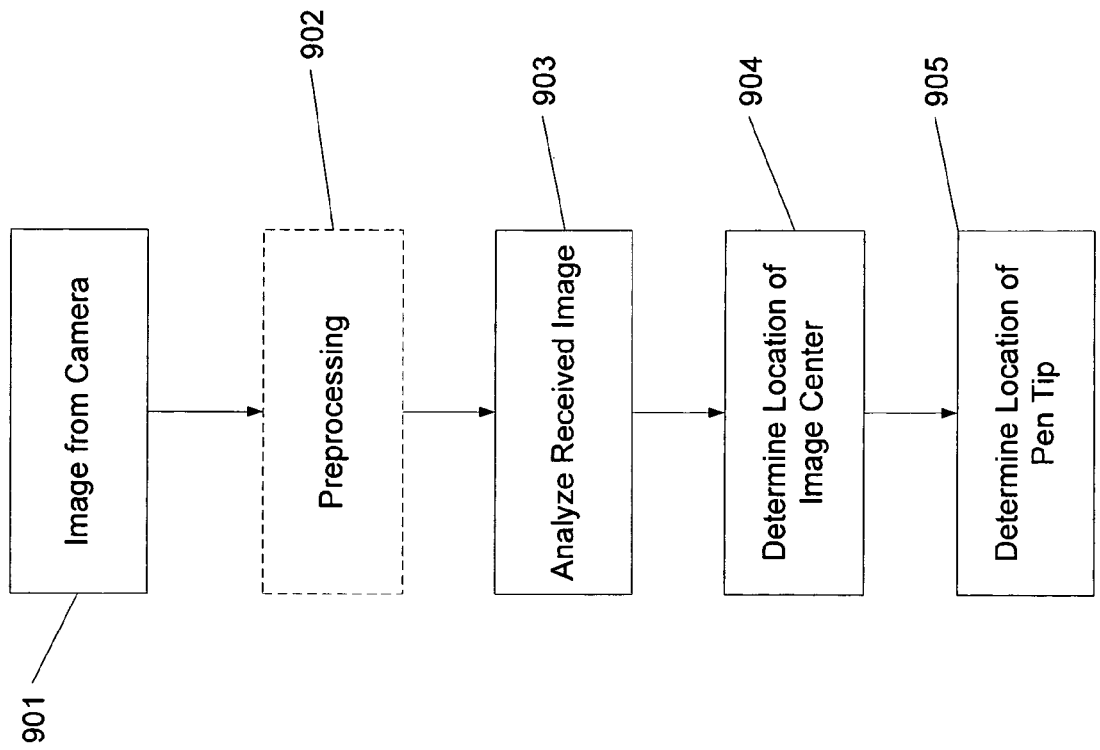
FIG. 9 shows a method for determining the location of a captured image in accordance with embodiments of the present invention.

FIG. 9 shows a process for determining the location of a pen tip. The input is an image captured by a camera and the output may be a position coordinates of the pen tip. Also, the output may include (or not) other information such as a rotation angle of the captured image.

In step 901, an image is received from a camera. Next, the received image may be optionally preprocessed in step 902 (as shown by the broken outline of step 902) to adjust the contrast between the light and dark pixels and the like.

Next, in step 903, the image is analyzed to determine the bit stream within it.

Next, in step 904, n bits are randomly selected from the bit stream for multiple times and the location of the received bit stream within the original sequence (or m-sequence) is determined.

Finally, once the location of the captured image is determined in step 904, the location of the pen tip may be determined in step 905.

Figure 10:
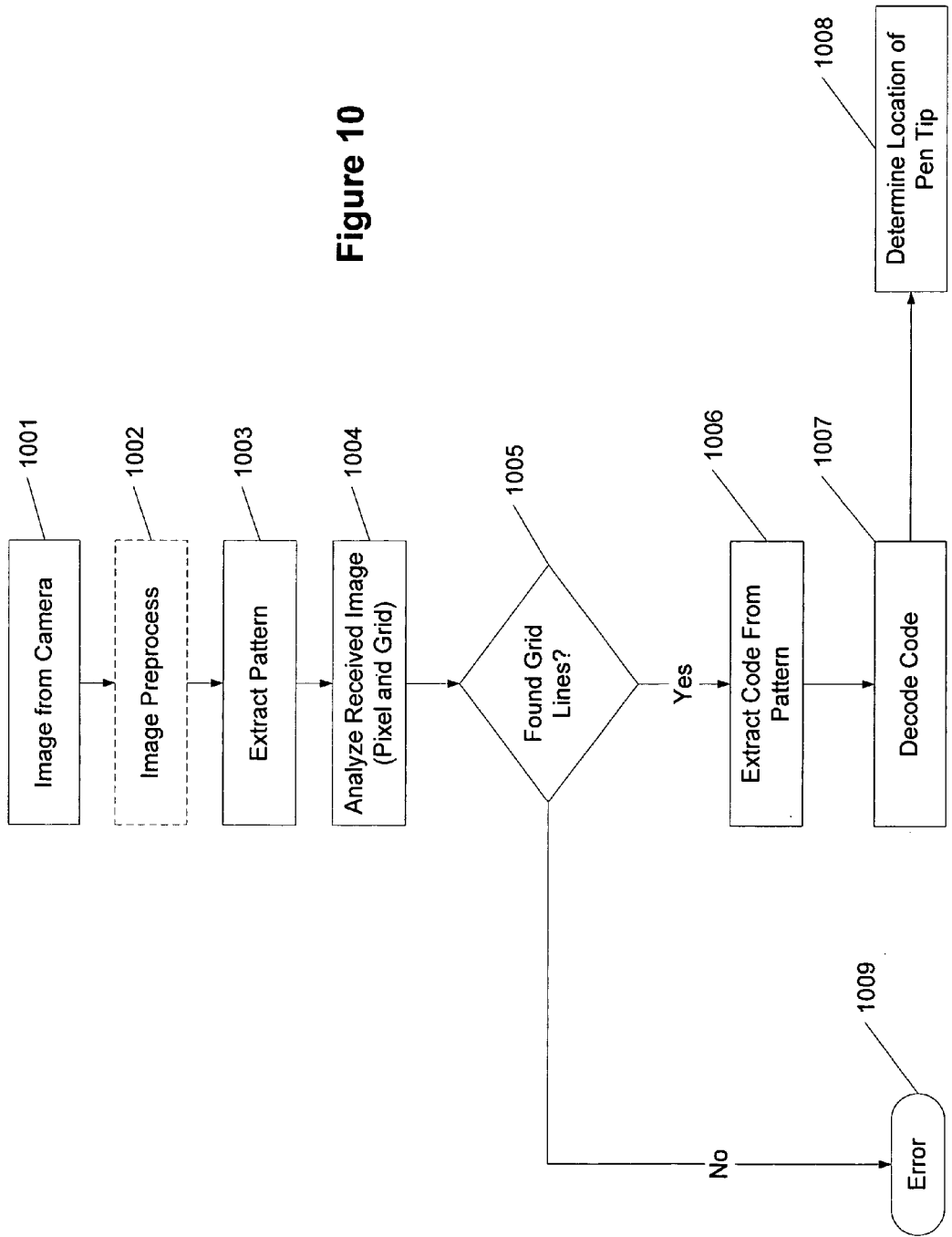
FIG. 10 shows another method for determining the location of captured image in accordance with embodiments of the present invention.

FIG. 10 gives more details about 903 and 904 and shows the approach to extract the bit stream within a captured image. First, an image is received from the camera in step 1001. The image then may optionally undergo image preprocessing in step 1002 (as shown by the broken outline of step 1002). The pattern is extracted in step 1003. Here, pixels on the various lines may be extracted to find the orientation of the pattern and the angle θ.

Next, the received image is analyzed in step 1004 to determine the underlying grid lines. If grid lines are found in step 1005, then the code is extracted from the pattern in step 1006. The code is then decoded in step 1007 and the location of the pen tip is determined in step 1008. If no grid lines were found in step 1005, then an error is returned in step 1009.

VIII. Mapping Camera-Captured-Image Strokes to Corresponding Pen-Tip Strokes

In accordance with various embodiments of the invention, x-y positions of the pen tip 202 may be determined by using a calibration parameter to map the x-y positions of the respective centers of images captured by the pen's camera 210 to the x-y positions of the tip of the pen.

FIG. 11 depicts a calibration module 1102 and a mapping module 1106 in accordance with various embodiments of the invention. The calibration module 1102 receives calibration input data 1100, which may be produced by a user placing the pen tip 202 in a fixed location on surface 207, which may be a positionally encoded medium, such as paper, and then rotating the pen and/or moving the opposite end of the pen in various directions to capture multiple images for use in generating a calibration parameter 1104.

The mapping module 1106 uses the calibration parameter 1104 and recovered camera-captured-location information 1110 to generate recovered pen-tip-location information 1108.

Figure 13:
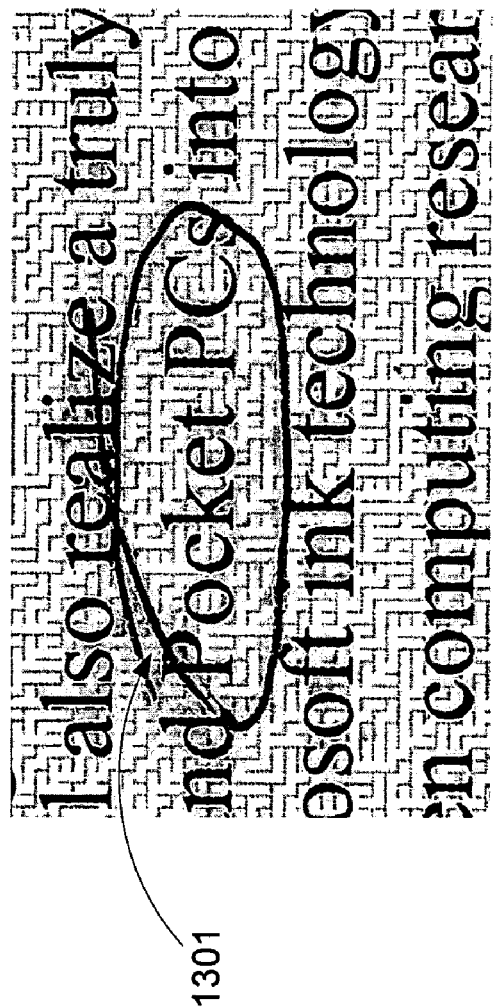
FIG. 13 shows an actual pen-tip stroke that is associated with the recovered strokes shown in FIG. 12.
Figure 15:
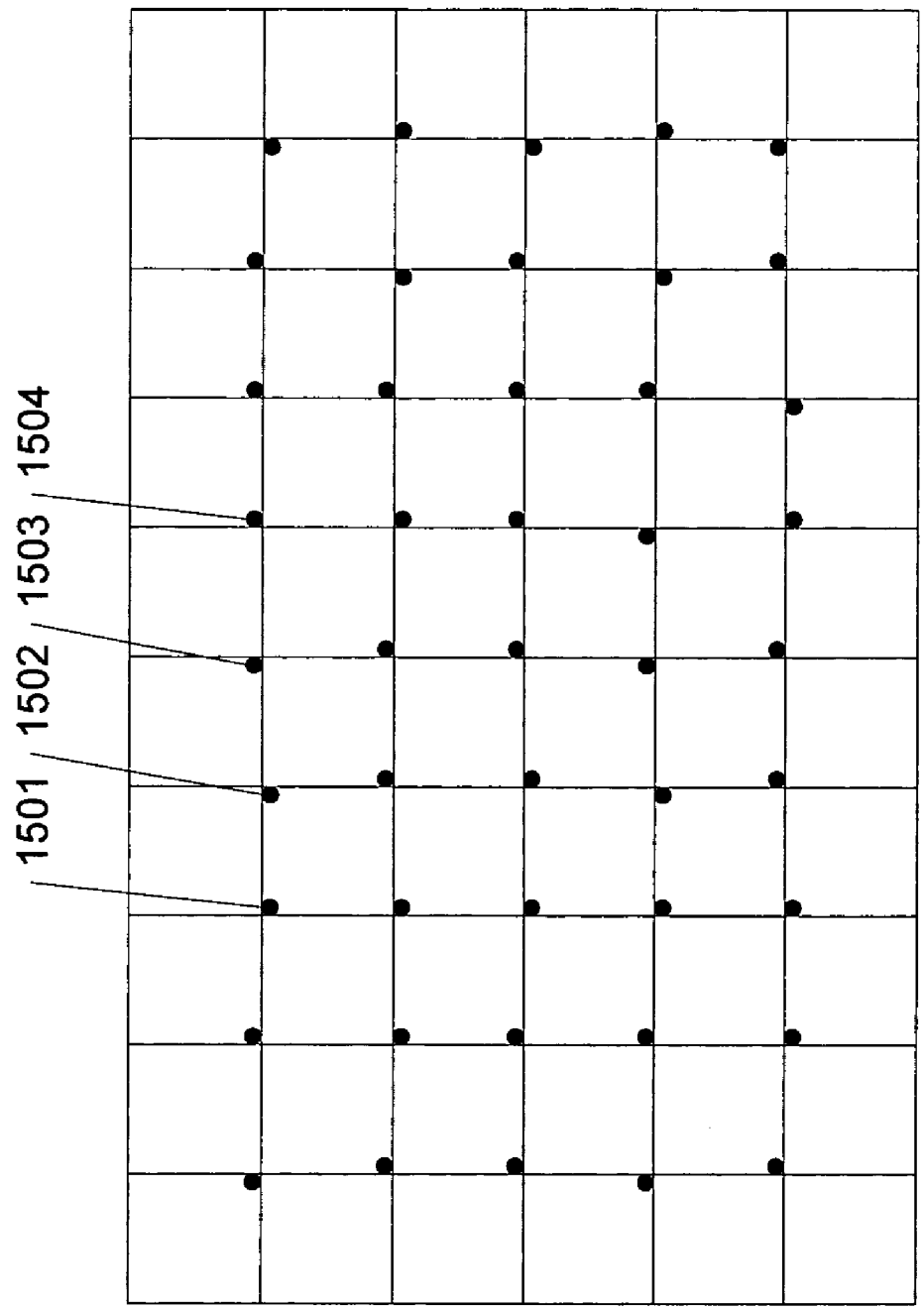
FIG. 15 shows a representation of encoding space in a document according to prior art.

FIG. 13 depicts a scanned copy of positionally encoded paper including text overlaid on a positionally encoded maze pattern. FIG. 13 shows a real ink stroke 1301 as written on the paper by a pen tip 202.

Figure 12:
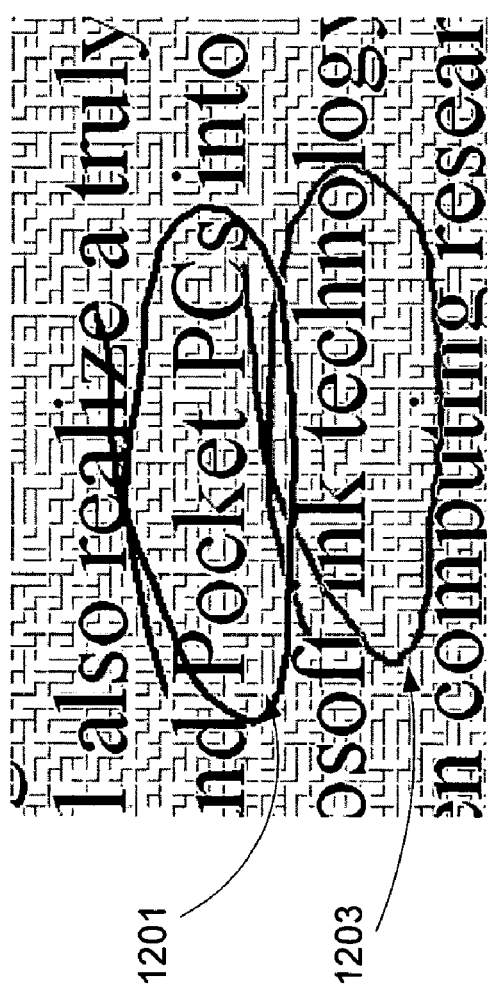
FIG. 12 shows a recovered camera-captured stroke (i.e. recovered from the respective centers of captured images) and a corresponding mapped pen-tip stroke in accordance with an embodiment of the invention.

FIG. 12 is a screen shot of a portion of an electronic copy of the positionally encoded paper corresponding to the scanned image of FIG. 13. In FIG. 12, a captured-image stroke 1203 has been recovered from the respective centers of images captured by the pen's camera 203 by determining the locations within the document of points along the captured-image stroke 1203.

FIG. 12 also depicts a recovered pen-tip stroke 1201 of the pen tip 202. The recovered pen-tip stroke 1201 may be obtained by applying a calibration parameter 1104 to the recovered captured-image stroke 1203.

In accordance with various embodiments of the invention, the virtual pen tip 212 is used for mapping the recovered image-center stroke 1203 to the recovered pen-tip stroke 1201. The location of the virtual pen-tip depends on a predetermined relationship between the actual pen-tip 202 and the camera 203 based on the configuration of the pen. The virtual pen tip 212 is the projected point of the pen-tip 202 on the image sensor plane 209. The location of the virtual pen-tip 212 on the image sensor plane 209 is unknown but fixed.

One way to map the location of the center of an image to the location of the pen tip is to identify the spatial relationship between the pen tip and the body of the pen, the spatial relationship between the body of the pen, the lens, and the image sensor, optical characteristics such as the focal length of the lens, the physical size of a pixel of the image sensor, the distance between the image center and the optical axis of the lens, and so on. These measurements typically require special equipment. Moreover, every time the configuration of the pen changes, such as when the ink cartridge is changed, this process may need to be repeated. The concept of the virtual pen tip renders these complicated steps unnec-essary. The perspective transform is applied to the location of the virtual pen tip to get the location of the pen tip, that is:

$$L_{pentip} = F_{S \to P}(L_{virtual\text{-}pentip}) \quad \ldots \quad (5)$$

IX. Calibration

Figure 14:
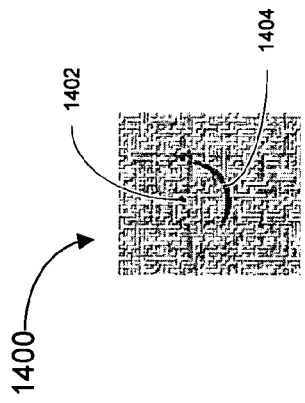
FIG. 14 shows a path recovered based on the respective centers of camera-captured images and a point to which points along the path are mapped via a calibration parameter in accordance with various embodiments of the invention.

A calibration parameter $L_{virtual\text{-}pentip}$ may be estimated in accordance with various embodiments of the invention by performing the following steps, (a) through (g):

(a) A user places the real-pen-tip 202 at a fixed location $L_{pentip}$ on surface 207. Referring to FIG. 14, a portion 1400 of a positionally encoded surface 207 is shown on which $L_{pentip}$ is shown at 1402.

(b) The user keeps the pen tip in the location $L_{pentip}$ and captures a series of images with different pen orientations (i.e., the pen may be rotated and/or the end of the pen that is opposite the pen tip 202 may be moved in various directions while the pen tip 202 remains in the fixed location $L_{pentip}$). Referring to FIG. 14, for $L_{pentip}$ 1402, images with centers along the path 1404 may be captured.

(c) Initialize $\overline{L}_{virtual\text{-}pentip}$ as (0, 0), where $\overline{L}_{virtual\text{-}pentip}$ is the estimated value of $L_{virtual\text{-}pentip}$.

(d) For each captured image, the transform $F_{S \to P}$ and $F^{P \to S} = F_{S \to P}^{-1}$ are calculated by m-array decoding and image matching, then equations 6 and 7 are evaluated:

$$L_{pentip}^{i} = F_{S \to P}^{i} \cdot L_{virtual\text{-}pentip}, \ i=1,2,\ldots,N \quad (6)$$

$$L_{virtual\text{-}pentip}^{i} F_{S \to P}^{i} \cdot (L_{pentip} + \Delta L_i), \ i=1,2,\ldots,N \quad (7)$$

where N is the number of captured images used for calibration and $\Delta L_i$ is the offset between the actual pen tip location in ith frame and $L_{pentip}$.

(e) With equation (6), set $L_{virtual\text{-}pentip}$ as $\overline{L}_{virtual\text{-}pentip}$ to get $L_{pentip}^{i}$, i=1,2,...,N. By averaging $L_{pentip}^{i}$, $\overline{L}_{pentip}$ is estimated as:

$$\overline{L}_{pentip} = \frac{1}{N}\sum_{i=1}^{i=N} L_{pentip}^{i} \quad (11)$$

(f) With equation (7), set $L_{pentip}$ as $\overline{L}_{pentip}$ to get $L_{virtual\text{-}pentip}^{i}$, i=1,2,...,N. By averaging $L_{virtual\text{-}pentip}^{i}$, $\overline{L}_{virtual\text{-}pentip}$ is estimated as:

$$\overline{L}_{virtual\text{-}pentip} = \frac{1}{N}\sum_{i=1}^{i=N} L_{virtual\text{-}pentip}^{i} \quad (12)$$

(g) Go to step (e).

After several iterations of steps (e) through (g), $L_{virtual\text{-}pentip}$ and $L_{pentip}$ will converge respectively to substantially more accurate results, which may be referred to as $L_{virtual\text{-}pentip}^{accurate}$ and $L_{pentip}^{accurate}$.

$L_{virtual\text{-}pentip}^{accurate}$ may then be used as the calibration parameter $L_{virtual\text{-}pentip}$ equation (5) for mapping the recovered image-center stroke 1203 to the recovered pen-tip stroke 1201.

An example will now be provided in which $$L_{virtual-pentip}^{accurate}$$

and $L_{virtual-pentip}$ are calculated based on the pen tip being placed at a fixed location $L_{pentip}$, and the pen being rotated such that 47 images are captured. From each image, a transform $F_{S \rightarrow P}$, and $$F_{P \rightarrow S} = F_{S \rightarrow P}^{-1},$$

can be obtained. As is shown below, after 47 iterations, $L_{virtual-pentip}$ converges from (0.00, 0.00) to finial result (30.80, 7.01), and $L_{pentip}$ converges to a final result of (978.87, 1618.55). Note that $L_{virtual-pentip}$ are in the coordinate system of the captured image with the image center as the origin and $L_{pentip}$ are in the coordinate system of the corresponding document.

Iteration Number 1—[Step c]—Initialize VirtualPentip (x=0.00, y=0.00) to calculate pen tip on paper for each image.

[Step e]:
Image 0 pen tip on paper: x=985.57, y=1649.70;
Image 1 pen tip on paper: x=985.20, y=1649.25;
. . . ;
Image 46 pen tip on paper: x=1006.41, y=1629.30;
Image 47 pen tip on paper: x=1006.76, y=1628.79;
Average Pen Tip on Paper: x=993.32, y=1643.28.
[Step f]—Use last Average Pen Tip on Paper (x=993.32, y=1643.28) to calculate VirtualPentip of each image:
Image 0 virtual pen tip: x=2.83, y=11.43;
Image 1 virtual pen tip: x=2.42, y=11.66;
. . . ;
Image 46 virtual pen tip: x=9.46, y=−17.72;
Image 47 virtual pen tip: x=10.55, y=−18.45;
Average VirtualPentip: x=3.65, y=0.88;
[Step g]—goto step e.
Iteration Number 2—[Step e]—Use last Average Virtual-Pentip (x=3.65, y=0.88) to calculate pen tip on paper of each image:
Image 0 pen tip on paper: x=984.86, y=1646.07;
Image 1 pen tip on paper: x=984.50, y=1645.58;
. . . ;
Image 46 pen tip on paper: x=1003.09, y=1628.06;
Image 47 pen tip on paper: x=1003.53, y=1627.54;
Average Pen Tip on Paper: x=991.64, y=1640.32.
[Step f]—Use last Average Pen Tip on Paper (x=991.64, y=1640.32) to calculate VirtualPentip of each image:
Image 0 virtual pen tip: x=6.25, y=10.93;
Image 1 virtual pen tip: x=5.79, y=11.12;
. . . ;
Image 46 virtual pen tip: x=11.93, y=−14.67;
Image 47 virtual pen tip: x=13.01, y=−15.41;
Average VirtualPentip: x=6.87, y=1.64.
[Step g]—goto step e.
Iteration Number 3—[Step e]—Use last Average Virtual-Pentip (x=6.87, y=1.64) to calculate pen tip on paper of every image:
. . .
Iteration Number 43—Average VirtualPentip: x=30.74, y=7.00.
. . .
Iteration Number 44—Average VirtualPentip: x=30.76, y=7.01.
. . .
Iteration Number 45—Average VirtualPentip: x=30.77, y=7.01.
. . .
Iteration Number 46—Average VirtualPentip: x=30.78, y=7.01.
. . .
Iteration Number 47—[Step f]—Use last Average Pen Tip on Paper (x=978.87, y=1618.55) to calculate VirtualPentip of each image:
Image 0 vitual pen tip: x=31.61, y=6.88;
Image 1 vitual pen tip: x=30.74, y=6.73;
. . .
Image 46 vitual pen tip: x=30.47, y=7.74;
Image 47 vitual pen tip: x=31.46, y=6.96;
Accordingly, in this example, the final value of Average VirtualPentip converges to x=30.80, y=7.01.

What has been described above is merely illustrative of the application of the principles of the invention. Those skilled in the art can implement other arrangements a and methods without departing from the spirit and scope of the invention. Any of the methods of the invention can be implemented in software that can be stored on computer disks or other computer-readable media.

We claim:

1. A method of calibrating a digital pen, which includes a pen tip and a camera, and of mapping a location of a center of a camera-captured image to a location of the pen tip, the method comprising:
generating a calibration parameter based on a plurality of images captured by the digital pen's camera by placing the pen in a plurality of different orientations while keeping the pen tip at a substantially fixed location $L_{pentip}$ on a positionally encoded surface, wherein the calibration parameter is generated based on a plurality of iteratively generated estimates of the calibration parameter; and
using the calibration parameter to map the location of the center of the camera-captured image to the location of the pen tip so that a stroke written by a user on the positionally encoded surface can be recovered at a location within an electronic copy of the positionally encoded surface, wherein the position of the recovered stroke within the electronic copy corresponds to a plurality of locations of the pen tip as the user was writing the stroke on the positionally encoded surface.

2. The method of claim 1, further comprising: calculating a transform $F_{S \rightarrow P}$ and an inverse transform $$F_{P \rightarrow S} = F_{S \rightarrow P}^{-1},$$

by in-array decoding and image matching, for each image of the plurality of captured images and then calculating:

$$L_{pentip}^i = F_{S \rightarrow P}^i \cdot L_{virtual-pentip}, i = 1, 2, \cdots, N, \text{ and}$$

$$L_{virtual-pentip}^i = F_{P \rightarrow S}^i \cdot (L_{pentip} + \Delta L_i), i = 1, 2, \cdots, N$$

where N is a number of captured images used for generating the calibration parameter and $\Delta L_i$ is an offset between an actual pen tip location in an ith frame and $L_{pentip}$.

3. The method of claim 2, further comprising: initializing $\overline{L}_{virtual-pentip}$ as (0, 0), where $\overline{L}_{virtual-pentip}$ is an estimated value of $L_{virtual-pentip}$.

4. The method of claim 3, further comprising: in the equation $$L_{pentip}^i = F_{S \to P}^i \cdot L_{virtual-pentip}, i = 1, 2, \cdots, N,$$

setting $L_{virtual-pentip}$ as $\overline{L}_{virtual-pentip}$ to get $L_{pentip}^i$, i=1,2, . . . , N and, by averaging $L_{pentip}^i$, estimating $\overline{L}_{pentip}$ as:

$$\overline{L}_{pentip} = \frac{1}{N}\sum_{i=1}^{i=N} L_{pentip}^i.$$

5. The method of claim 4, further comprising: in the equation $$L_{virtual-pentip}^i = F_{P \to S}^i \cdot (L_{pentip} + \Delta L_i), i = 1, 2, \cdots, N,$$

setting $L_{pentip}$ as $\overline{L}_{pentip}$ to get $L_{virtual-pentip}^i$, i=1,2, . . . ,N and, by averaging $L_{virtual-pentip}^i$, estimating $L_{virtual-pentip}$ as:

$$\overline{L}_{virtual-pentip} = \frac{1}{N}\sum_{i=1}^{i=N} L_{virtual-pentip}^i.$$

6. The method of claim 5, further comprising: repeating the steps of claims 4 and 5 a plurality of times such that the estimate of $L_{virtual-pentip}$ converges to a substantially more accurate result $$L_{virtual-pentip}^{accurate}$$

and the estimate of $L_{pentip}$ converges to a substantially more accurate result $$L_{pentip}^{accurate}.$$

7. The method of claim 6, further comprising: using $$L_{virtual-pentip}^{accurate}$$

as the calibration parameter for mapping the location of the center of the camera-captured image to the location of the pen tip.

8. The method of claim 1, further comprising: using a virtual pen tip to map a recovered camera-captured stroke to a recovered pen-tip stroke, wherein a location of the virtual pen-tip on an image-sensing plane of the digital pen depends on a predetermined relationship between the tip of the pen and the pen's camera, wherein the predetermined relationship is based on the configuration of the pen.

9. A computer-readable medium containing computer-executable instructions that generate a calibration parameter for a digital pen, which includes a pen tip and a camera, wherein mapping, the location of the image center to the location of the tip of the pen on a positionally encoded surface, depends on the calibration parameter, by performing steps comprising: generating the calibration parameter based on a plurality of images captured by the digital pen's camera by placing the pen in a plurality of different orientations while keeping the pen tip at a fixed location $L_{pentip}$ on the positionally encoded surface, wherein the calibration parameter is generated based on a plurality of iteratively generated estimates of the calibration parameter.

10. The computer-readable medium of claim 9, containing further computer-executable instructions that calculate a transform $F_{S \to P}$ and an inverse transform $$F_{P \to S} = F_{S \to P}^{-1},$$

by image matching, for each image of the plurality of captured images and that calculate:

$$L_{pentip}^i = F_{S \to P}^i \cdot L_{virtual-pentip}, i = 1, 2, \cdots, N, \text{ and}$$

$$L_{virtual-pentip}^i = F_{P \to S}^i \cdot (L_{pentip} + \Delta L_i), i = 1, 2, \cdots, N$$

where N is a number of captured images used for generating the calibration parameter and $\Delta L_i$ is an offset between an actual pen tip location in an ith frame and $L_{pentip}$.

11. The computer-readable medium of claim 10, containing further computer-executable instructions that initialize $\overline{L}_{virtual-pentip}$ as (0, 0), where $\overline{L}_{virtual-pentip}$ is an estimated value of $L_{virtual-pentip}$.

12. The computer-readable medium of claim 11, containing further computer-executable instructions for, in the equation $$L_{pentip}^i = F_{S \to P}^i \cdot L_{virtual-pentip}, i = 1, 2, \cdots, N,$$

setting $L_{virtual-pentip}$ as $\overline{L}_{virtual-pentip}$ to get $L_{pentip}^i$, i=1, 2, . . . ,N and, by averaging $L_{pentip}^i$, estimating $\overline{L}_{pentip}$ as:

$$\overline{L}_{pentip} = \frac{1}{N}\sum_{i=1}^{i=N} L_{pentip}^i.$$

13. The computer-readable medium of claim 12, containing further computer-executable instructions for, in the equation $$L_{virtual-pentip}^i = F_{P \to S}^i \cdot (L_{pentip} + \Delta L_i), i = 1, 2, \cdots, N,$$

setting $L_{pentip}$ as $\overline{L}_{pentip}$ to get $L_{virtual-pentip}^i$, i=1,2, . . . ,N and, by averaging $L_{virtual-pentip}^i$, estimating $L_{virtual-pentip}$ as:

$$\overline{L}_{virtual-pentip} = \frac{1}{N}\sum_{i=1}^{i=N} L_{virtual-pentip}^i.$$

14. The computer-readable medium of claim 13, containing further computer-executable instructions for repeating the calculations of claims 12 and 13 a plurality of times such that the estimate of $L_{virtual-pentip}$ converges to a substantially more accurate result $$L_{virtual-pentip}^{accurate}$$

and the estimate of $L_{pentip}$ converges to a substantially more accurate result $$L_{pentip}^{accurate}.$$

15. The computer-readable medium of claim 14, containing further computer-executable instructions for using $$L^{accurate}_{virtual-pentip}$$

as the calibration parameter $L_{virtual\text{-}pentip}$ for mapping the location of the image center to the location of the tip of the pen.

16. A computer-readable medium containing computer-executable instructions that calibrate a digital pen, which includes a pen tip and a camera, and that map a location of a center of a camera-captured image to a location of the pen tip, by performing steps comprising:

generating a calibration parameter based on a plurality of images captured by the digital pen's camera by placing the pen in a plurality of different orientations while keeping the pen tip at a substantially fixed location $L_{pentip}$ on a positionally encoded surface, wherein the calibration parameter is generated based on a plurality of iteratively generated estimates of the calibration parameter; and using the calibration parameter to map the location of the center of the camera-captured image to the location of the pen tip so that a stroke written by a user on the positionally encoded surface can be recovered at a location within an electronic copy of the positionally encoded surface, wherein the position of the recovered stroke within the electronic copy corresponds to a plurality of locations of the pen tip as the user was writing the stroke on the positionally encoded surface.

17. The computer-readable medium of claim 16, containing further computer-executable instructions for using a virtual pen tip to map a recovered camera-captured stroke to a recovered pen-tip stroke, wherein a location of the virtual pen-tip on an image-sensing plane of the digital pen depends on a predetermined relationship between the tip of the pen and the pen's camera, wherein the predetermined relationship is based on the configuration of the pen.

18. A system that calibrates a digital pen, which includes a pen tip and a camera, and that maps a location of a center of a camera-captured image to a location of the pen tip, the system comprising:

a calibration module that generates a calibration parameter based on a plurality of images captured by the digital pen's camera with the pen in a plurality of different orientations while the pen tip is at a substantially fixed location $L_{pentip}$ on the positionally encoded surface, wherein the calibration parameter is generated based on a plurality of iteratively generated estimates of the calibration parameter; and a mapping module that uses the calibration parameter to map the location of the center of the camera-captured image to the location of the pen tip so that a stroke written by a user on the positionally encoded surface can be recovered at a location within an electronic copy of the positionally encoded surface, wherein the position of the recovered stroke within the electronic copy corresponds to a plurality of locations of the pen tip as the user was writing the stroke on the positionally encoded surface.

19. The system of claim 18, wherein the calibration module calculates a transform $F_{S \to P}$ and an inverse transform $$F_{P \to S} = F^{-1}_{S \to P},$$

by image matching, for each image of the plurality of captured images and then calculates:

$$L^i_{pentip} = F^i_{S \to P} \cdot L_{virtual-pentip}, i = 1, 2, \cdots, N, \text{ and}$$

$$L^i_{virtual-pentip} = F^i_{P \to S} \cdot (L_{pentip} + \Delta L_i), i = 1, 2, \cdots, N$$

where N is a number of captured images used for generating the calibration parameter and $\Delta L_i$, an offset between an actual pen tip location in an ith frame and $L_{pentip}$.

20. The system of claim 19, wherein the calibration module initializes $\overline{L}_{virtual-pentip}$ as (0, 0), where $\overline{L}_{virtual-pentip}$ is an estimated value of $L_{virtual-pentip}$.

21. The system of claim 20 wherein, in the equation $$L^i_{pentip} = F^i_{S \to P} \cdot L_{virtual-pentip},$$

$$i = 1, 2, \ldots, N, L_{virtual-pentip}$$

is set as $\overline{L}_{virtual-pentip}$ to get $L_{pentip}^i$, i=1,2, . . . ,N and, $L_{pentip}$ is estimated, by averaging $L_{pentip}^i$, as:

$$\overline{L}_{pentip} = \frac{1}{N} \sum_{i=1}^{i=N} L^i_{pentip}.$$

22. The system of claim 21, wherein, in the equation $$L^i_{virtual-pentip} = F^i_{P \to S} \cdot (L_{pentip} + \Delta L_i), i = 1, 2, \ldots, N, L_{pentip}$$

is set as $\overline{L}_{pentip}$ to get $L_{virtual-pentip}^i$, i=1,2, . . . ,N and $L_{virtual\ pentip}$ is estimated, by averaging $L_{virtual-pentip}^i$ as:

$$\overline{L}_{virtual-pentip} = \frac{1}{N} \sum_{i=1}^{i=N} L^i_{virtual-pentip}.$$

23. The system of claim 22, wherein, the calibration module repeats the calculations of claims 21 and 22 a plurality of times such that the estimate Of $L_{virtual-pentip}$, converges to a substantially more accurate result $$L^{accurate}_{virtual-pentip}$$

and the estimate of $L_{pentip}$ converges to a substantially more accurate result $$L^{accurate}_{pentip}.$$

24. The system of claim 23, wherein, the calibration module outputs $$L^{accurate}_{virtual-pentip}$$

from the calibration module as the calibration parameter for use by the mapping module to map the recovered image-center stroke to the recovered pen-tip stroke.

25. The system of claim 18, wherein the mapping module uses a virtual pen tip to map a recovered camera-captured stroke to a recovered pen-tip stroke, wherein a location of the virtual pen-tip on an image-sensing plane of the digital pen depends on a predetermined relationship between the tip of the pen and the pen's camera, wherein the predetermined relationship is based on the configuration of the pen.

* * * * *